(12) United States Patent
Dubus

(10) Patent No.: US 11,181,144 B2
(45) Date of Patent: Nov. 23, 2021

(54) BEARING HAVING THREADED ROLLERS

(71) Applicant: Jérome Dubus, Aix les Bains (FR)

(72) Inventor: Jérome Dubus, Aix les Bains (FR)

( * ) Notice: Subject to any disclaimer, the term of this patent is extended or adjusted under 35 U.S.C. 154(b) by 0 days.

(21) Appl. No.: 16/766,431

(22) PCT Filed: Nov. 27, 2018

(86) PCT No.: PCT/FR2018/053013
§ 371 (c)(1),
(2) Date: May 22, 2020

(87) PCT Pub. No.: WO2019/110891
PCT Pub. Date: Jun. 13, 2019

(65) Prior Publication Data
US 2021/0148401 A1    May 20, 2021

(30) Foreign Application Priority Data

Dec. 4, 2017  (FR) .................... 17 61592

(51) Int. Cl.
*F16C 19/36*    (2006.01)
*F16C 33/30*    (2006.01)
(Continued)

(52) U.S. Cl.
CPC .......... *F16C 19/36* (2013.01); *F16C 33/306* (2013.01); *F16C 33/363* (2013.01);
(Continued)

(58) Field of Classification Search
CPC .......... F16C 19/36; F16C 19/38; F16C 19/50; F16C 33/306; F16C 33/36; F16C 33/363;
(Continued)

(56) References Cited

U.S. PATENT DOCUMENTS 230,884 A * 8/1880 Luigi .................... F16C 33/306
384/550
1,441,691 A * 1/1923 Lockwood .............. F16C 43/06
384/574

(Continued)

FOREIGN PATENT DOCUMENTS

CN    102628500 A    8/2012
DE    4115758    * 11/1992
(Continued)

OTHER PUBLICATIONS

Translation of FR3031554 obtained Apr. 5, 2021.*
(Continued)

*Primary Examiner* — James Pilkington
(74) *Attorney, Agent, or Firm* — Ware, Fressola, Maguire & Barber LLP

(57) ABSTRACT

A rolling bearing mechanism comprising a rod (110), an outer ring (130) surrounding the rod coaxially, and rollers (120) interposed between the rod (110) and the outer ring (130), with the rod, the outer ring, and the rollers each having a respective right-handed thread and a respective left-handed thread, the left-handed threads (122*a*) of the rollers meshing with the right-handed thread (112*a*) of the rod and with the left-handed thread of the outer ring, and the right-handed threads (122*b*) of the rollers (120) meshing with the left-handed thread (112*b*) of the rod (110) and with the right-handed thread of the outer ring (130).

14 Claims, 2 Drawing Sheets

(51) Int. Cl.
  *F16C 33/36*  (2006.01)
  *F16C 33/58*  (2006.01)
(52) U.S. Cl.
  CPC .......... F16C 33/581 (2013.01); F16C 33/585 (2013.01); *F16C 2300/00* (2013.01)
(58) Field of Classification Search
  CPC ...... F16C 33/523; F16C 33/58; F16C 33/581; F16C 33/583; F16C 33/585; F16C 33/60; F16C 2300/00; F16C 2300/28
  USPC .......................................................... 384/566
  See application file for complete search history.

(56) References Cited

U.S. PATENT DOCUMENTS

| | | | |
|---|---|---|---|
| 3,938,865 A | | 2/1976 | Rouverol |
| 3,963,286 A | * | 6/1976 | Stanley .................. F16C 19/36 384/550 |
| 4,037,893 A | * | 7/1977 | Perrin ................. F16H 25/2252 384/550 |
| 9,435,377 B2 | | 9/2016 | Cornelius |
| 10,156,257 B2 | * | 12/2018 | Cornelius ............. F16C 33/585 |
| 10,422,375 B2 | * | 9/2019 | Schmitz ................ F16C 33/485 |
| 2014/0165754 A1 | | 6/2014 | Buvril et al. |

FOREIGN PATENT DOCUMENTS

| | | |
|---|---|---|
| EP | 1617103 A1 | 1/2006 |
| FR | 888281 A | 12/1943 |
| FR | 2999674 B1 | 6/2014 |
| FR | 3031554 A1 | 7/2016 |
| WO | 8203435 A1 | 10/1982 |
| WO | 2004094870 A1 | 7/2006 |

OTHER PUBLICATIONS

PCT International Search Report and Written Opinion dated Mar. 18, 2019 from corresponding Application No. PCT/FR2018/053013 with English translation, 12 pages.
Office Action dated Jul. 23, 2021 issued by the Korean Patent Office in corresponding Application No. 10-2020-7014974, and English translation (12 pages).
Office Action dated Aug. 31, 2021 issued by the Japanese Patent Office in corresponding Application No. 2020-547320, and English translation (5 pages).

* cited by examiner

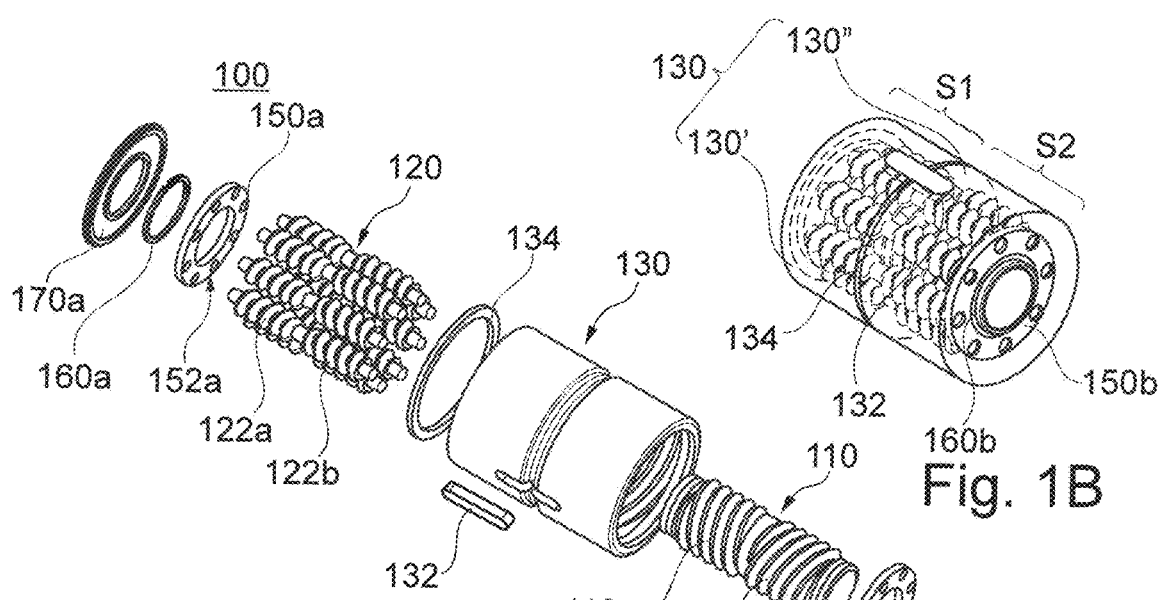
Fig. 1A
Fig. 1B
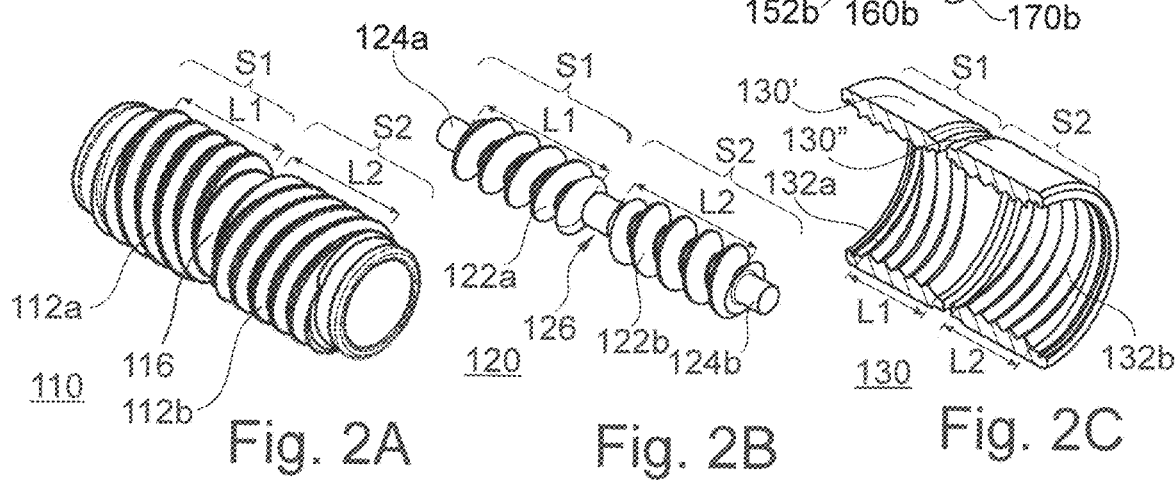
Fig. 2A
Fig. 2B
Fig. 2C
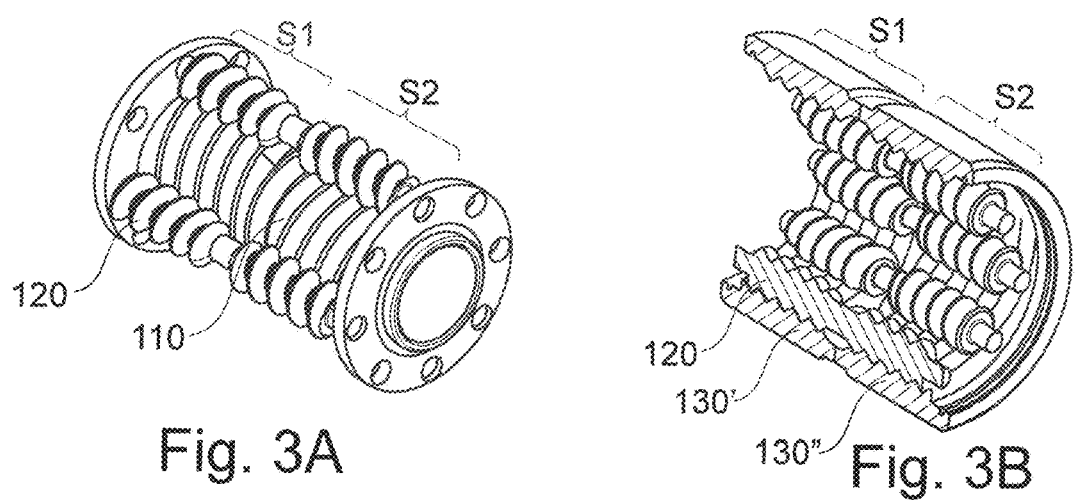
Fig. 3A
Fig. 3B

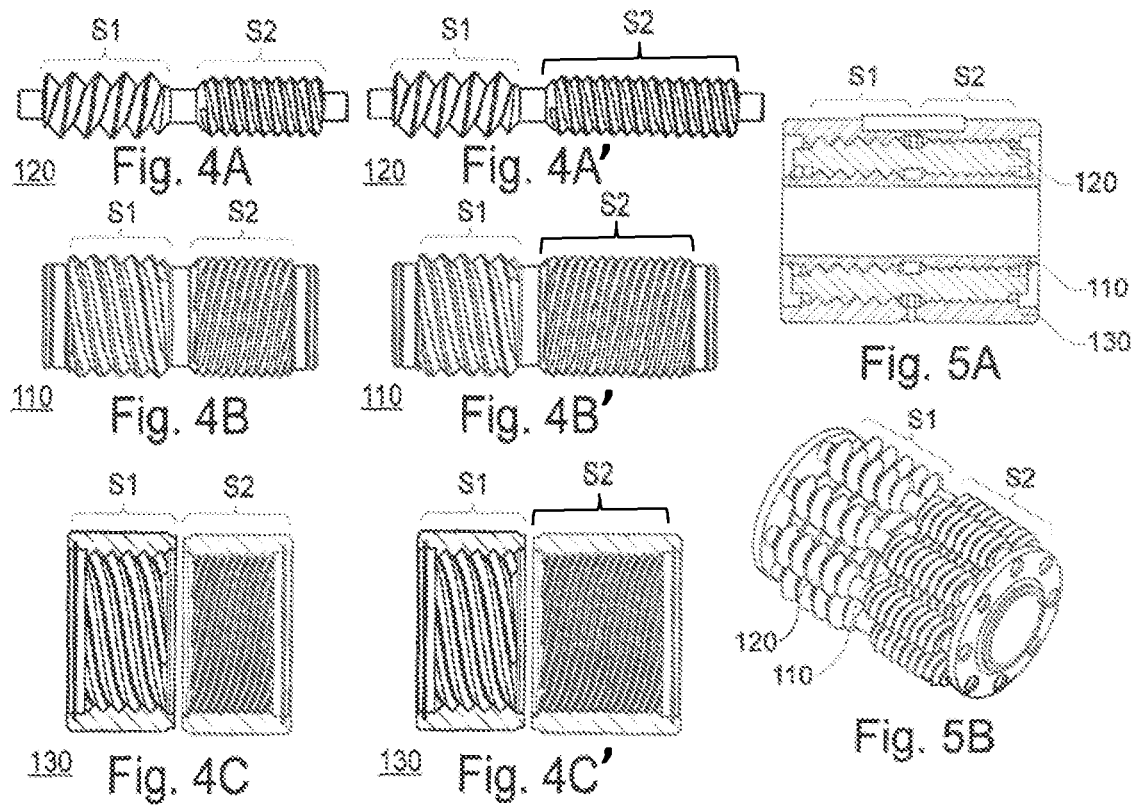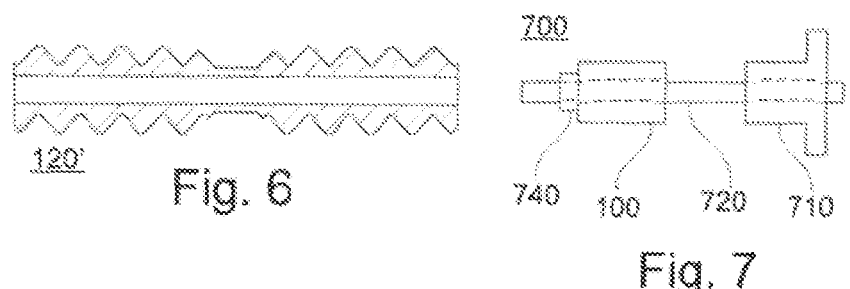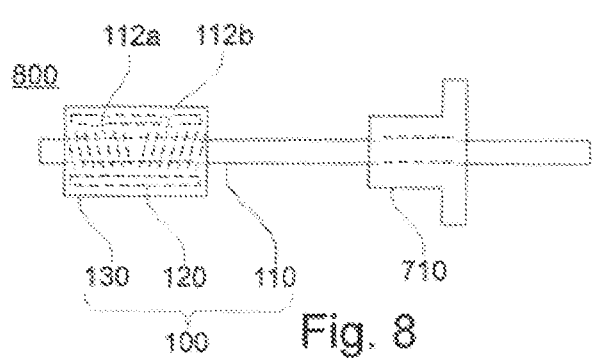

BEARING HAVING THREADED ROLLERS

CROSS REFERENCE TO RELATED APPLICATIONS

This application is the U.S. National Stage of PCT/FR2018/053013 filed on Nov. 27, 2018, which application claims priority under 35 USC § 119 to French Patent Application No. 17 61592 filed on Dec. 4, 2017. Both of these applications are hereby incorporated by reference in their entirety.

TECHNICAL FIELD

The invention relates to the field of rolling bearings, such a bearing being a mechanism that supports and guides an assembly in rotation.

BACKGROUND OF THE INVENTION

Conventional rolling bearings include ball bearings, tapered roller bearings, or indeed cylindrical roller bearings, and such conventional bearings are the most widely used because of their low cost, with the drawback of being of large overall size in particular when they are dimensioned to bear high loads.

Rolling bearings exist that are based on systems of rollers having screw threads or grooves and that are more costly than conventional bearings but that have higher load capacities and/or are more compact, i.e. smaller in overall size, and offer improved general performance.

Patent Document FR 3 031 554 discloses a rolling bearing that belongs to this category and that comprises an outer ring, an inner ring, and rollers interposed between the two rings; each of the rollers has at least one threaded portion and at least one of the rings has at least one threaded portion, the threaded portions of the rollers meshing with the threaded portion of said ring, and the threads being such that the outer ring and the inner ring do not move axially while they are moving in rotation relative to each other, thereby forming a roller screw having zero pitch.

In that bearing, each of the rollers has a portion having circular grooves and at least one of the rings has a portion having circular grooves, the grooved portions of the rollers meshing with the grooved portion of said ring.

The rolling bearing of Patent FR 3 031 554 thus combines the structure of the bearing that uses a system of rollers having circular grooves as described in U.S. Pat. No. 9,435,377 with the structure of the bearing that uses a system of rollers having threads as described in Patent Application FR 2 999 674, thereby avoiding the risks of axial slippage that are inherent to systems having circular grooves, without however requiring sets of teeth for synchronizing the rollers, such sets of teeth being sources of drawbacks with systems having threads.

International Patent Application PCT/CH81/00036 discloses a speed-reducing mechanism that operates as an endless screw or "worm screw" with a tangent wheel formed by a shaft and threaded rollers in a casing.

SUMMARY OF THE INVENTION

The advantages of the bearing of Patent FR 3 031 554 are obtained only at the price of increased sophistication both in its design and in its use: its design, manufacture, and assembly depend simultaneously on the characteristics of the circular grooves and on the characteristics of the threads, which makes it a solution that is technically difficult to use.

An object of the invention is to propose a roller bearing that can be used as an abutment or thrust bearing in the sense of an axial rolling bearing or thrust bearing, and that forms a technical solution offering an alternative to those of existing rolling bearings, that procures excellent load capacity for a given overall size, that is more reliable, and that is simpler and easier to manufacture and assemble, while also being less costly.

To this end, the invention provides a rolling bearing mechanism comprising a rod, an outer ring surrounding the rod coaxially, and rollers having longitudinal axes parallel to the longitudinal axes of the rod and of the outer ring, each roller being interposed between the rod and the outer ring so that threads on the rollers mesh with a thread on the rod and with a thread in the outer ring, in which rolling bearing mechanism the rod, the outer ring, and the rollers each have a respective right-handed thread and a respective left-handed thread, the right-handed thread of the rod being situated in a first axial segment of the mechanism, and the left-handed thread being situated in a second axial segment of the mechanism, the second axial segment being axially distant from the first axial segment, and, in the first axial segment, the left-handed threads of the rollers meshing with the right-handed thread of the rod and with the left-handed thread of the outer ring, and, in the second axial segment, the right-handed threads of the rollers meshing with the left-handed thread of the rod and with the right-handed thread of the outer ring.

In this mechanism, which is simpler to adapt to different applications and to manufacture than the comparable existing technical solutions, the threads are of opposing "handedness" whereby they have self-compensatory action that prevents the rollers from slipping axially, and that brings excellent stability to said rollers under loading, including at high speeds of rotation; in this way the threads perform, by themselves, both the function of transmitting load and also the function of synchronizing the rollers, and make it possible to obtain a system having high load capacity with almost no slippage, and having a long life span.

Assembly of the mechanism is also advantageous since, as it does not involve any grooves or sets of teeth, the mechanism is very easy to assemble by screw-fastening.

The rolling bearing mechanism of the invention may advantageously have the following characteristics:

the right-handed thread of the rod, the left-handed threads of the rollers, and the left-handed thread of the outer ring may have helix angles that are mutually equal or substantially mutually equal; and the left-handed thread of the rod, the right-handed threads of the rollers, and the right-handed thread of the outer ring may have helix angles that are mutually equal or substantially mutually equal, in such a manner as to constitute a differential screw having zero pitch;

the right-handed thread of the rod, the left-handed threads of the rollers, and the left-handed thread of the outer ring may have a first number of start(s) that is one or more, and the left-handed thread of the rod, the right-handed threads of the rollers, and the right-handed thread of the outer ring may have a second number of start(s) that is one or more that is different from the first number of start(s), so that the rolling bearing mechanism may have load capacities that differ between two directions of axial loading of the mechanism;

the rod may have the right-handed thread over a first axial length along the rod, the rollers may have the left-handed threads over the first length along the rollers, and the outer ring may have the left-handed thread over the first length along the outer ring; and the rod may have the left-handed thread over a second axial length along the rod, the rollers may have the right-handed threads over the second length along the rollers, and the outer ring may have the right-handed thread over the second length along the outer ring; it being possible for the second axial length to be different from the first axial length, so that the rolling bearing mechanism may have load capacities that differ between two directions of axial loading of the mechanism;

each of the rollers may be made integrally in one piece and the rod may be made integrally in one piece;

the outer ring may be made up of two pieces, one of which pieces has the left-handed thread and the other of which pieces has the right-handed thread; and the rollers may be hollow.

The invention may also provide a mechanical actuator device for generating linear movement driven by a drive screw, which mechanical actuator device includes the rolling bearing mechanism of the invention, and a drive screw, both of which are mounted on a shaft or shank that is common to the rolling bearing mechanism and to the drive screw, the rolling bearing mechanism being configured in such a manner as to form a bearing for guiding the common shaft or shank.

The mechanical actuator device of the invention may advantageously have the following characteristics:

the mechanical actuator device may further include another rod on which said drive screw is mounted, it being possible for the rolling bearing mechanism of the invention to be mounted on said other rod, said other rod constituting said common shaft or shank and being an integral part of the drive screw; and the drive screw may be mounted directly on the rod of the rolling bearing mechanism of the invention, said rod constituting said common shaft or shank and being an integral part of the drive screw.

BRIEF DESCRIPTION OF THE DRAWINGS

The present invention can be better understood and other advantages appear on reading the following detailed description of an embodiment given by way of non-limiting example and with reference to the accompanying drawings, in which:

FIG. 1A is an exploded view of a rolling bearing mechanism of the invention, and FIG. 1B is a view of the same mechanism after it has been assembled;

FIGS. 2A, 2B and 2C are views showing respectively a rod, a roller, and an outer ring of the mechanism of FIG. 1A;

FIGS. 3A and 3B show the positioning of rollers respectively relative to the rod and relative to the outer ring in the assembled bearing mechanism of FIG. 1B;

FIGS. 4A and 4A', 4B and 4B' and 4C and 4C' are views respectively showing a roller, a rod, and an outer ring, each of which is provided with threads having different numbers of starts;

FIGS. 5A and 5B are views respectively in section and in perspective of rollers and of the rod shown in FIGS. 4A and 4B;

FIG. 6 shows a hollow roller;

FIG. 7 shows a first device incorporating the rolling bearing mechanism of FIG. 1A; and FIG. 8 shows a second device incorporating the rolling bearing mechanism of FIG. 1A.

DESCRIPTION OF AN EMBODIMENT

A rolling bearing mechanism of the invention is shown in FIGS. 1A and 1B, 2A to 2C, 3A and 3B, 4A to 4C, 4A' to 4C', 5A and 5B, 6, 7, and 8.

FIG. 1A shows a particular rolling bearing mechanism, taken by way of example for illustrating the main elements making up a rolling bearing mechanism of the invention.

It should be understood that neither the invention nor the present embodiment are limited to this particular situation.

As shown in FIG. 1A, a rolling bearing mechanism 100 may comprise a rod 110, an outer ring 130 disposed around the rod, surrounding it coaxially, and a plurality of rollers 120 interposed between the rod and the outer ring and having their longitudinal axes parallel to the longitudinal axes of the rings.

The rod 110 may be solid or hollow, and when it is hollow, it may also be referred to as an "inner ring"; the rod 110 may extend longitudinally on either side of the outer ring 130, e.g. as in the device shown in FIG. 8.

As shown in detail in FIGS. 2A, 2B, and 2C, the rod 110 and the rollers 120 are provided with external threads, and the outer ring 130 is provided with internal threads, the threads extending over a plurality of revolutions about their respective axes and being configured such that, in an assembled bearing such as the one shown in FIG. 1B, the threads of the rollers mesh with the threads of the rod and with the threads of the outer ring, as shown in FIGS. 3A and 3B respectively.

In accordance with the principle of the invention, the rod, the rollers, and the outer ring are provided with first threads, respectively 112$a$, 122$a$ and 132$a$, that are designed to be situated in a first axial segment S1 of the assembled bearing, and with second threads, respectively 112$b$, 122$b$ and 132$b$, that are designed to be situated in a second axial segment S2 of the assembled bearing, as shown in FIGS. 1B, 2A, 2B, and 2C, the second threads 112$b$, 122$b$, and 132$b$ being oriented in a direction opposite from the direction or "handedness" in which the first threads 112$a$, 122$a$ and 132$a$ are oriented.

The first thread 112$a$ of the rod 110 has a first orientation or "handedness", e.g. it is right-handed, and the second thread 112$b$ of the rod 110 has a second handedness, opposite from the first handedness and, in this example, it is left-handed; the first threads 122$a$ of the rollers 120 and the first thread 132$a$ of the rod 130 have the second handedness, i.e. they are left-handed in this example, and the second threads 122$b$ of the rollers 120 and the second thread 132$b$ of the outer ring 130 have the first handedness, i.e. they are right-handed in this example, thereby forming a structure including threaded segments that are of opposite handedness and that can, individually for each of the rollers, for the rod, and for the outer ring, be described as being in a "chevron" pattern.

The threads of the axial segment S1 are formed over a first axial length L1 along the rod, along the rollers, and along the outer ring; and the threads of the axial segment S2 are formed over a second axial length L2 along the rod, along the rollers, and along the outer ring, as indicated respectively in FIGS. 2A, 2B, and 2C; the first axial length L1 may be equal to or different from the second axial length L2.

In an assembled bearing, the first threads 122$a$ of the rollers 120 mesh with the first thread 112$a$ of the rod 110 and with the first thread 132$a$ of the outer ring 130, and the second threads 122b of the rollers 120 mesh with the second thread 112b of the rod 110 and with the second thread 132b of the outer ring 130, as shown in FIGS. 3A and 3B, so that the left-handed threads 122a of the rollers mesh with the right-handed thread 112a of the rod and with the left-handed thread 132a of the outer ring, and so that the right-handed threads 122b of the rollers mesh with the left-handed thread 112b of the rod and with the right-handed thread 132b of the outer ring.

In addition, the first threads of the rollers, of the rod, and of the outer ring have helix angles that are mutually equal or substantially mutually equal, and the second threads of the rollers, of the rod, and of the outer ring have helix angles that are mutually equal or substantially equal, so that the right-handed threads of the rollers and of the outer ring and the left-handed thread of the rod have helix angles that are mutually equal or substantially mutually equal, and the left-handed threads of the rollers and of the outer ring and the right-handed thread of the rod have helix angles that are mutually equal or substantially mutually equal.

A direct consequence of this arrangement of the rolling bearing mechanism, with helix angles that are equal or substantially equal for threads that mesh with one another, is that, when the rod is caused to move in rotation relative to the outer ring, the rollers are axially stationary relative to the rod and to the outer ring, thereby making this rolling bearing a bearing of the differential roller screw type with resulting pitch of zero.

As a result of errors during manufacturing and/or of deformations of the components, a certain margin of inaccuracy always remains in their dimensions, such as, for example, in the primitive diameters of the rollers.

Therefore, in practice, the helix angles of any two threads cannot be strictly equal to each other, which, in similar devices such as zero-pitch differential roller screws, leads to a natural tendency for the rollers to slip in one direction, which tendency needs to be countered by holding mechanisms such as sets of teeth.

However, in the rolling bearing mechanism of the invention, the rod, the rollers, and the outer ring have opposing threads; if, for example, a slippage due to inaccuracies in the threads situated in the first segment S1 of the mechanism tends to take place in a given direction, such slippage is automatically and immediately stopped by a compensatory action imposed by opposite slippage and/or by an abutment or thrust action due to the opposing threads situated in the second segment S2, and vice versa.

By means of this compensatory action of the opposing threads, the threaded rolling bearing mechanism of the invention does not need any synchronization sets of teeth or any equivalent synchronization system.

A superficial analysis might result in thinking that the compensation mechanism could result in axial tension on the rollers that could, ultimately, deform them and/or break them.

In reality, the system is used under a one-directional load that maintains the rollers substantially in a permanent state of compression that the residual tension induced by the slippage is not capable of changing and that thus prevents the above-mentioned axial tension phenomenon.

All of the threads, both the right-handed threads and the left-handed threads, may have substantially the same helix angle and/or be formed over the same axial length.

Alternatively, the threads of the rod, of the rollers, and of the outer ring that are situated in the first segment S1 may have a first helix angle and/or the first segment S1 may have a first axial length L1 over which the threads are formed, and the threads of the rod, of the rollers, and of the outer ring that are situated in the second segment S2 may have a second helix angle and/or the second segment S2 may have a second axial length L2 over which the threads are formed, which second helix angle and which second axial length are different respectively from the first helix angle and from the first axial length.

This configuration may, for example, be envisioned for compensating for a slippage differential consequent upon the forces applied to the rolling bearing mechanism.

The profiles of the threads of the rollers may be concave when the profiles of the threads of the rod and of the outer ring are convex, or convex when the profiles of the threads of the rod and of the outer ring are concave, or all of the threads may have trapezoidal profiles.

It is also possible to apply to the threads of the rolling bearing mechanism a geometry having curved-line contacts, whereby the regions of contact between the meshed threads are not defined by points of contact but rather by lines of contact, thereby making it possible to increase the load capacities and/or the life spans.

The threads, in particular the threads on the rollers, are not limited to single threads and may be multiple start threads, such as, for example, double threads or quadruple threads that are characterized by numbers of starts of two and four, respectively.

The number of points of contact, or the total surface area of contact, between the rollers and the rod and between the rollers and the outer ring increases in proportion to the numbers of starts of the threads, thereby increasing, in parallel, the rolling bearing capacity of the mechanism.

It is possible to cause the numbers of starts of the threads to vary independently in each of the segments S1 and S2, e.g. with helix pitch and/or length remaining constant.

Thus, FIGS. 4A, 4B and 4C show a roller, a rod, and an outer ring provided with threads having numbers of starts in their segments S2 that are respectively twice the numbers of starts of the threads in their segments S1.

FIGS. 4A', 4B' and 4C' are similar to FIGS. 4A, 4B and 4C, respectively, except that the lengths of segments S1 and S2 are different.

In any given segment S1 or S2, the threads of the rollers must naturally correspond to the threads of the rod and of the outer ring in order to mesh correctly, while taking into account the helix pitches, the crest profiles and heights, and the numbers of starts of said threads, as shown in the axial section view 5A through a roller mechanism as assembled and in the perspective view 5B showing the threads of the rollers meshing with the threads of the rod, with numbers of starts of thread that are different in the segments S1 and S2.

By changing the helix pitches, the axial lengths over which the threads are formed, the profiles and/or the numbers of starts of the threads, the number of points of contacts, or the total surface area of contact, between the rollers and the rod and between the rollers and the outer ring may be modulated, independently in each of the segments S1 and S2 of the rolling bearing mechanism, thereby making it possible to cause the capacity of the rolling bearing mechanism to vary between the two directions of axial loading of the mechanism.

Independently of the operating advantages of the rolling bearing mechanism of the invention (compactness, weight, high load capacity, durability, or indeed stability, including at high speeds of rotation), the structure of the mechanism makes it easy to adapt to various applications, e.g. by adjusting the helix angles, the number of rollers, the numbers of starts and the profiles of the threads, or indeed the axial lengths over which said threads are formed.

Assembly of this novel mechanism is also extremely advantageous, since the rod, the outer ring, and the rollers may be merely positioned and screw-fastened, unlike in mechanisms based on rollers having threads that cannot be merely screw-fastened due to the presence of gearing or meshing such as sets of teeth, and unlike in mechanisms based on rollers having grooves that make it necessary to deform the parts to be adjusted in order to engage them in one another.

A preferable arrangement for the mechanism is to include rollers 120 that are each made integrally in one piece and a rod 110 that is made integrally in one piece, and an outer ring 130 that is made up of two pieces 130' and 130" corresponding respectively to the first axial segment S1 and to the second axial segment S2, as indicated in FIGS. 1B and 2C.

Alternatively to using one-piece rollers and/or a one-piece rod, it is possible to manufacture each of the rollers in two pieces and to manufacture a rod in two pieces, and then to assemble the pieces.

The two pieces of the outer ring 130' and 130" may be constrained not to move relative to each other in rotation by a key 132, and be separated by a shim 134 made integrally in one piece or made in a plurality of pieces, which shim may serve to apply an axial pre-load.

The rod may be provided with a disengagement groove 116 and each of the rollers may be provided with a disengagement groove 126, each of these grooves being constituted by a substantially cylindrical portion separating the first threads from the second threads so as to facilitate disengaging a tool that is used to manufacture them, such as a grinder, mill, or cutter.

In this way, the first threads of the rod and of the rollers are axially distant from the respective ones of the second threads of the rod and of the rollers, substantially cylindrical portions extending from said first threads to the respective ones of said second threads, and the first axial segment S1 of the rolling bearing being axially distant from the second axial segment S2 of the rolling bearing.

The rod 110, the rollers 120 and the outer ring 130 may be manufactured by using techniques such as whirling, precision grinding, hard turning, and burnishing; the rod and the rollers may be manufactured by rolling; the outer ring may be manufactured by tapping.

In addition to the elements listed and described in detail above, the rolling bearing shown in FIG. 1A has a device for holding the rollers, which device comprises: annular guides 150a and 150b mounted between the rod and the outer ring and provided with cylindrical recesses 152a and 152b in which journals 124a and 124b are received that extend the ends of the corresponding rollers; retainer rings 160a and 160b, each of which is mounted in a corresponding groove arranged in the outer ring so as to hold the annular guides; and sealing gaskets 170a and 170b for preventing contamination and for retaining lubricant.

The recesses 152a and 152b in the annular guides for receiving the journals of the rollers are shown to be through holes in this example, but they could also be non-through holes in order to improve the sealing of the rolling bearing, e.g. so as to keep lubricant inside said bearing.

Two annular guides 150a and 150b are shown in this example, each of which is made in one piece, which guides are situated at two opposite ends of the bearing 100, but it is also possible to use one annular guide only, made up of at least two pieces and situated in the middle of the rolling bearing, e.g. at the disengagement groove 126.

If only one annular guide is used, the recesses may be through holes if one-piece rollers are used, and non-through holes if rollers in two or more pieces are used, and in the latter situation a system may be used for constraining the pieces of each roller not to move relative to each other in rotation and axially.

Alternatively, it is possible to implement a rolling bearing mechanism of the invention that does not have any guide for the rollers.

It should be noted that although a mechanism having solid rollers 120 provided with journals 124a and 124b is described above, it is also possible to use hollow rollers 120' of annular section such as the roller show in section in FIG. 6, e.g. so as to save weight; the annular guides then have to be adapted to the geometry of the rollers, e.g. by replacing the recesses 152a and 152b with journals designed to engage axially in the rollers.

Due to its high load capacity, the rolling bearing mechanism of the invention lends itself particularly well to being used in combination with screws that themselves have high load capacities, such as ball screws or roller screws.

Thus, a mechanical actuator device may include the rolling bearing mechanism of the invention and a drive screw, both of which are mounted on a shaft or shank that is common to the rolling bearing mechanism and to the drive screw, the rolling bearing mechanism being configured in such a manner as to form an abutment or thrust bearing in the sense of an axial rolling bearing, limiting the movement of the drive screw, the common shaft or shank being guided in rotation by the rolling bearing mechanism.

For example, FIG. 7 shows a mechanical actuator device 700 for generating linear movement driven by a drive screw, which mechanism includes a drive screw 710 mounted on another rod 720 that constitutes the common shaft or shank and on which a rolling bearing mechanism 100 of the invention is also mounted, the rod 110 of which is hollow, is slid over the other rod 720, and is fastened thereto by a fastening element 740.

The screw 710 may be a roller screw and the rod 720 may be a rod that is fully or partially threaded and that is an integral part of the drive screw.

Alternatively, the screw 710 may be a ball screw and the rod 720 may be a rod that is fully or partially threaded, or a splined or fluted shaft.

In such an actuator device, the rolling bearing mechanism of the invention may be used as a high-capacity bearing.

An example that is an alternative to the example shown in FIG. 7 is given in FIG. 8, which shows a device 800 having a higher level of integration than the device 700.

Like the device 700, the device 800 includes a drive screw 710 and a rolling bearing 100 of the invention that are mounted in alignment along a shared axis, but the rod 110 of the rolling bearing extends longitudinally out of the rolling bearing and acts as the common shaft or shank, and the screw 710 is mounted directly on said rod 110, which may be an integral part of the drive screw 710.

Outside the segments receiving the rollers 120 and the outer ring 130 of the rolling bearing mechanism 100, the rod 110 may be partially or totally threaded, or may have a segment in the form of a splined or fluted shaft.

What is claimed is:

1. A rolling bearing mechanism comprising:
   a rod;
   an outer ring surrounding the rod coaxially; and
   a plurality of rollers, each roller having a longitudinal axis parallel to a longitudinal axis of the rod and a longitudinal axis of the outer ring, each roller being interposed between the rod and the outer ring so that threads on the rollers mesh with a thread on the rod and with a thread in the outer ring, wherein the rod, the outer ring, and the rollers each have a respective right-handed thread and a respective left-handed thread, wherein the right-handed thread of the rod is situated in a first axial segment of the mechanism, and the left-handed thread is situated in a second axial segment of the mechanism, the second axial segment being axially distant from the first axial segment, wherein in the first axial segment, the left-handed threads of the rollers mesh with the right-handed thread of the rod and with the left-handed thread of the outer ring, and wherein in the second axial segment, the right-handed threads of the rollers mesh with the left-handed thread of the rod and with the right-handed thread of the outer ring.

2. The rolling bearing mechanism according to claim 1, wherein the right-handed thread of the rod, the left-handed threads of the rollers, and the left-handed thread of the outer ring have helix angles that are mutually equal or substantially mutually equal; and the left-handed thread of the rod, the right-handed threads of the rollers, and the right-handed thread of the outer ring have helix angles that are mutually equal or substantially mutually equal.

3. The rolling bearing mechanism according to claim 2, wherein the rod has the right-handed thread over a first axial length along the rod, the rollers have the left-handed threads over the first length along the rollers, and the outer ring has the left-handed thread over the first length along the outer ring; and the rod has the left-handed thread over a second axial length along the rod, the rollers have the right-handed threads over the second length along the rollers, and the outer ring has the right-handed thread over the second length along the outer ring; the second axial length being different from the first axial length, so that the rolling bearing mechanism has load capacities that differ between two directions of axial loading of the mechanism.

4. The rolling bearing mechanism according to claim 2, wherein each of the rollers is made integrally in one piece and the rod is made integrally in one piece.

5. The rolling bearing mechanism according to claim 2, wherein the outer ring is made up of two pieces, one of which pieces has the left-handed thread and the other of which pieces has the right-handed thread.

6. The rolling bearing mechanism according to claim 2, wherein the rollers are hollow.

7. The rolling bearing mechanism according to claim 1, wherein the right-handed thread of the rod, the left-handed threads of the rollers, and the left-handed thread of the outer ring have a first number of starts that is one or more, and the left-handed thread of the rod, the right-handed threads of the rollers, and the right-handed thread of the outer ring have a second number of starts that is one or more that is different from the first number of starts that is one or more, so that the rolling bearing mechanism has load capacities that differ between two directions of axial loading of the mechanism.

8. The rolling bearing mechanism according to claim 1, wherein the rod has the right-handed thread over a first axial length along the rod, the rollers have the left-handed threads over the first length along the rollers, and the outer ring has the left-handed thread over the first length along the outer ring; and the rod has the left-handed thread over a second axial length along the rod, the rollers have the right-handed threads over the second length along the rollers, and the outer ring has the right-handed thread over the second length along the outer ring; the second axial length being different from the first axial length, so that the rolling bearing mechanism has load capacities that differ between two directions of axial loading of the mechanism.

9. The rolling bearing mechanism according to claim 1, wherein each of the rollers is made integrally in one piece and the rod is made integrally in one piece.

10. The rolling bearing mechanism according to claim 1, wherein the outer ring is made up of two pieces, one of which pieces has the left-handed thread and the other of which pieces has the right-handed thread.

11. The rolling bearing mechanism according to claim 1, wherein the rollers are hollow.

12. A mechanical actuator device for generating linear movement driven by a drive screw, which mechanical actuator device includes a rolling bearing mechanism according to claim 1, and a drive screw, both of which are mounted on a shaft or shank that is common to the rolling bearing mechanism and to the drive screw, the rolling bearing mechanism being configured in such a manner as to form a bearing for guiding the common shaft or shank.

13. The mechanical actuator device according to claim 12 for generating linear movement driven by a drive screw, which mechanical actuator device further includes another rod on which said drive screw is mounted, wherein the rolling bearing mechanism is mounted on said other rod, said other rod constituting said common shaft or shank and being an integral part of the drive screw.

14. The mechanical actuator device according to claim 12 wherein the drive screw is mounted directly on the rod of the rolling bearing mechanism, said rod constituting said common shaft or shank and being an integral part of the drive screw.

* * * * *